United States Patent

Hellman et al.

(10) Patent No.: US 7,206,163 B2
(45) Date of Patent: Apr. 17, 2007

(54) DATA STORAGE DEVICE FOR RECORDING TO MAGNETIC THREAD

(75) Inventors: Diana J. Hellman, Tucson, AZ (US); Mark E. Dean, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 428 days.

(21) Appl. No.: 10/918,567

(22) Filed: Aug. 12, 2004

(65) Prior Publication Data

US 2006/0034019 A1 Feb. 16, 2006

(51) Int. Cl.
*G11B 5/008* (2006.01)

(52) U.S. Cl. .................................... 360/89
(58) Field of Classification Search .............. None
See application file for complete search history.

(56) References Cited

U.S. PATENT DOCUMENTS

| | | | |
|---|---|---|---|
| 2,418,543 A * | 4/1947 | Camras | 360/89 |
| 2,476,110 A * | 7/1949 | Neufeld | 360/89 |
| 2,511,606 A * | 6/1950 | Tompkins et al. | 360/89 |
| 3,568,171 A | 3/1971 | Lesher | |
| 4,048,048 A | 9/1977 | Bennett et al. | |
| 4,212,037 A | 7/1980 | Lemelson | |
| 4,578,717 A | 3/1986 | Lemelson | |
| 5,089,693 A | 2/1992 | Haddock | |
| 5,699,214 A * | 12/1997 | Kano et al. | 360/89 |

OTHER PUBLICATIONS

Video Interchange (2004) www.videointerchange.com/wire_recorder1.htm.

* cited by examiner

*Primary Examiner*—Robert S. Tupper
(74) *Attorney, Agent, or Firm*—Dan Shifrin

(57) ABSTRACT

A data storage device for recording to and reading from magnetic thread includes a head assembly having an opening through which the magnetic thread passes. Transducing elements are positioned around the inner surface of the opening and interact with longitudinally-extending parallel tracks formatted around the surface of the magnetic thread. If the number of tracks is greater than the number of transducing elements, the transducing elements may be rotatable about the magnetic thread to position the transducing elements to interact with other tracks. The head assembly may open to aid positioning the magnetic thread within the opening in the head assembly during loading. If desired, multiple head assemblies may be placed in the thread path to improve data throughput. The magnetic thread may be formed with a non-circular cross-section and the opening in the head assembly may have a corresponding cross-section to reduce twisting of the magnetic thread as it passes through the opening.

28 Claims, 4 Drawing Sheets

DATA STORAGE DEVICE FOR RECORDING TO MAGNETIC THREAD

TECHNICAL FIELD

The present invention relates generally to magnetic data storage devices and, in particular, to a magnetic data storage device for recording data to and reading data from a magnetic thread.

BACKGROUND ART

The earliest magnetic recording devices were invented in the late 1800s and recorded sound on metal wire. Wire recorders employed a single recording transducer and became more practical and widely used in the late 1940s and into the 1950s. Subsequently, however, flat magnetic recording tape and recorders become more reliable and replaced wire recorders, particularly when recorders with two transducing elements were developed which could record/playback two parallel tracks on the magnetic tape, such as for a stereo recording.

Magnetic tape has also long been used to store computer data; current tape is typically being formatted with numerous parallel tracks. The corresponding data recorder includes a number transducing elements to read from or write to at least some of the tracks simultaneously. To access other tracks, a head assembly is moved laterally across the width of the tape. Servo tracks on the tape enable the transducing elements to maintain a proper position relative to the recording tracks (registration).

To increase the storage capacity of magnetic tape, the linear density of the data bits on the tape may be increased (by recording the bits closer together), the track density may be increased (by decreasing the width of the tracks to fit more tracks across a given tape width), or the length of the tape may be increased. Each of these methods eventually runs into technical barriers. For example, increasing the linear density requires that the media manufacturer be able to produce smaller bits without adversely affecting the signal-to-noise ratio. While 256-track tapes and recording devices capable of recording to and reading from them have been developed, increasing the track density still further requires even smaller transducing elements and the ability to keep them centered over the tracks. Finally, increasing the length of the tape requires that the thickness be decreased if the volume of the tape is to remain substantially constant. Consequently, new technology must be developed to manufacture thinner tape as well as to handle it in the tape drive.

An additional issue with magnetic tape is its environmental stability. As tracks become narrower, even minute changes in the position of a track may lead to track misregistration and the inability to record to or read from a track. While temperature fluctuations have always been an issue, thinner tape is more prone to warpage and other problems from even smaller temperature changes.

Consequently, a need remains for a magnetic recording format which is less susceptible to the problems described above.

SUMMARY OF THE INVENTION

The present invention provides a data storage device for recording to and reading from magnetic thread. The device includes a head assembly having an opening through which the magnetic thread passes. Transducing elements are positioned around the surface of the opening and are capable of interacting with longitudinally-extending parallel tracks formatted around the surface of the magnetic thread. If the number of tracks is greater than the number of transducing elements, the transducing elements may be rotatable about the magnetic thread to position the transducing elements to interact with other tracks. The head assembly may open to aid positioning the magnetic thread within the opening in the head assembly during loading. If desired, multiple head assemblies may be placed in the thread path to improve data throughput. The magnetic thread may be formed with a non-circular cross-section and the opening in the head assembly may have a corresponding cross-section to reduce twisting of the magnetic thread as it passes through the opening.

The present invention further provides a magnetic thread for use with the data storage device. The thread may be manufactured from any suitable material, such as a polyester material. Polyethylene terephthalate (PET) and polyethylene naphthalate (PEN) are two such materials.

DETAILED DESCRIPTION OF THE PREFERRED EMBODIMENT

Figure 1:
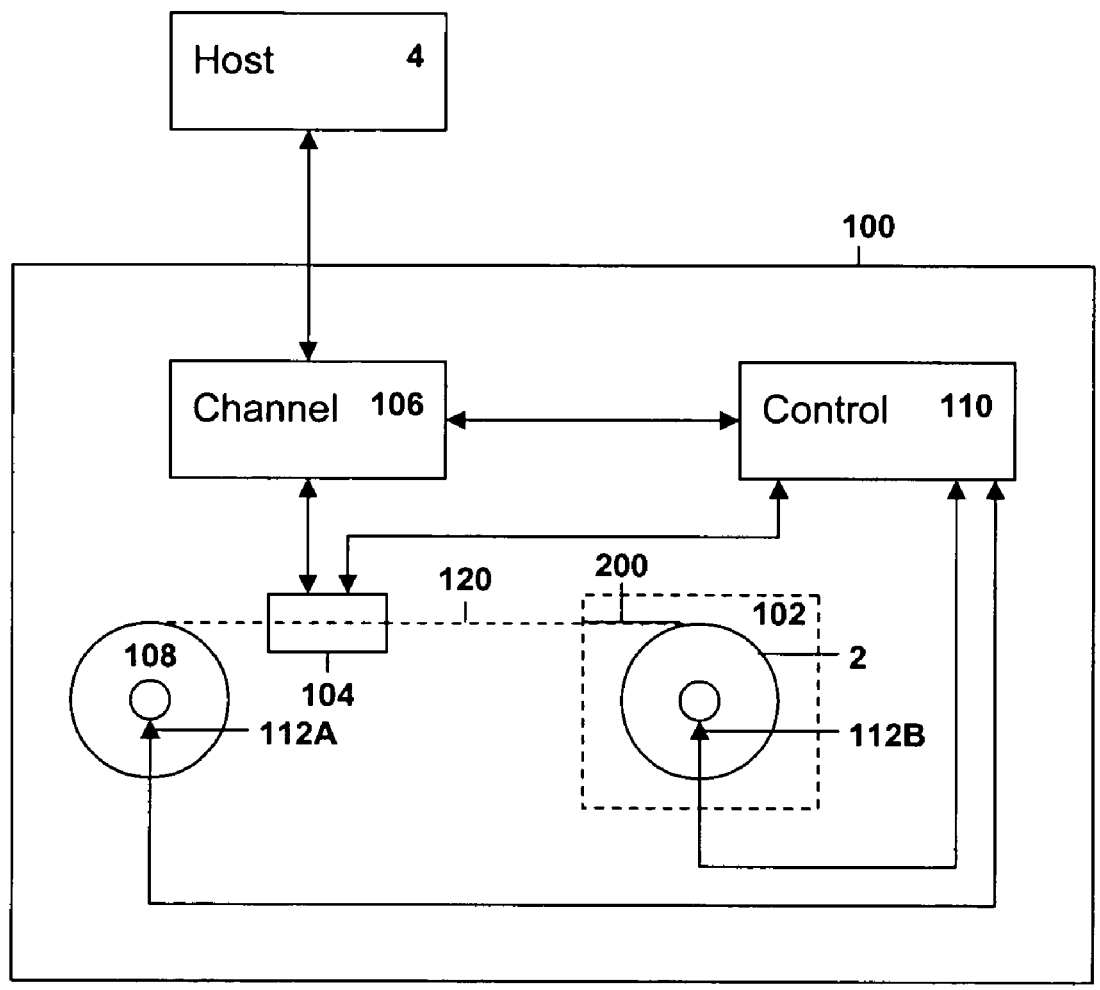
FIG. 1 is a block diagram of an embodiment of a data storage device of the present invention.

FIG. 1 is a block diagram of an embodiment of a data storage device 100 of the present invention. The device 100 includes a loader 102 for receiving a reel 2 on which magnetic thread 200 is wound. The reel 2 may be an open reel or contained within a protective cartridge. A head assembly 104 is positioned in a thread path and transducing elements within the head assembly interact with the magnetic thread. A channel 106 is coupled to the transducing elements and, when reading data from the magnetic thread 200, processes signals received from at least one transducing element and transmits the processed signals to a host device 4 in a known manner. When recording data to the magnetic thread 200, the controller 104 processes signals received from the host device 4 and transmits the processed signals to at least one of the transducing elements. A second reel 108 at one end of the thread path receives the magnetic thread 200 from the first reel 2. Although the second reel 108 may be a part of the storage device 100, in one arrangement, the second reel 108 may be contained with the first reel 2 within a protective cartridge. An opening in the cartridge allows the magnetic thread 200 to be pulled from the cartridge and passed through the head assembly 104. The scope of the present invention is not limited by the precise arrangement of the first and second reels 2 and 108.

A controller 110 is coupled to the channel 106 and to a transport mechanism 112A, 112B which drive the two thread reels 2 and 108. The controller 110 controls the speed and direction of the magnetic thread 200 as it passes through the head assembly 104. The controller 110 may also control the positioning of the head assembly 104 relative to the magnetic thread 200 in a manner described below.

Figure 2:
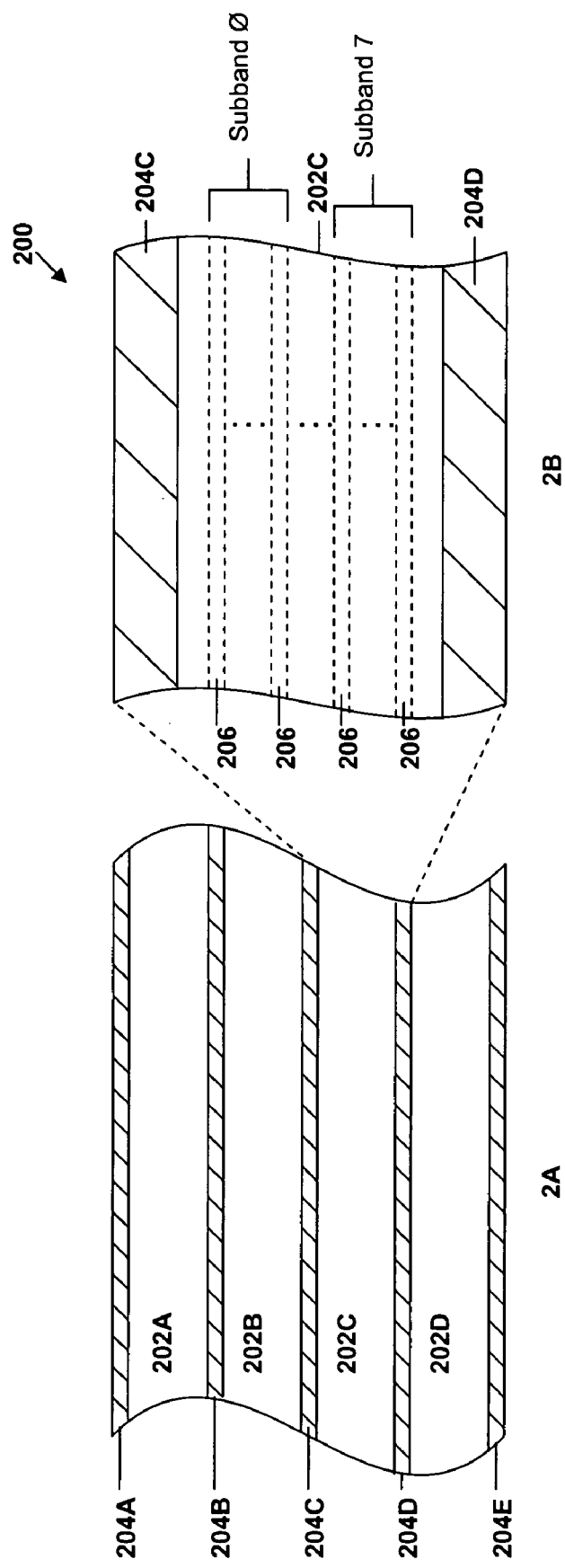
FIGS. 2A and 2B illustrate a track format of a magnetic thread of the present invention.

FIGS. 2A and 2B illustrates the manner in which parallel tracks may be formatted around the perimeter of the magnetic thread 200, longitudinally-extending along the entire length of the magnetic thread 200. The width of the magnetic thread 200 is divided into parallel bands. One set of bands 202A, 202B, 202C, 202D comprise data tracks for storing user data and a second set of bands 204A, 204B, 204C, 204D, 204E comprise servo tracks for enable the transducing elements to maintain proper registration relative to the data tracks. FIG. 2B illustrates individual tracks 206 formatted within one of the data bands 202C. In the embodiment of the magnetic thread illustrated, the data bands 202A, 202B, 202C, 202D are divided into eight sub-bands, with each sub-band having sixteen tracks. It will be appreciated, however, that other track formats may be employed.

Figure 3:
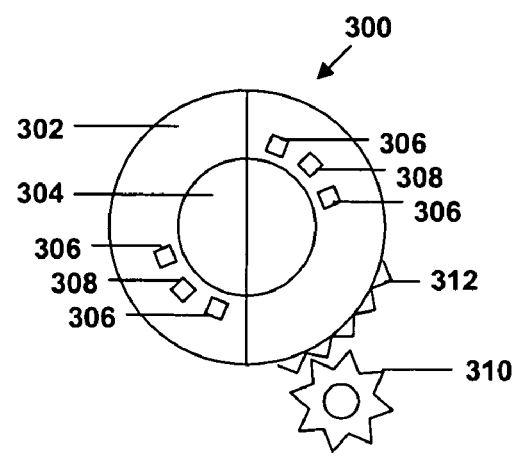
FIG. 3 is a cross-sectional view of an embodiment of a head assembly capable of rotating about the magnetic thread to access different tracks.

FIG. 3 is a cross-sectional view of an embodiment of a head assembly 300. The head assembly 300 includes a housing 302 having an opening formed therethrough to receive the magnetic thread 200. One or more data transducing elements 306, and one or more servo transducing elements 308 are positioned around the inside of the opening 304. Preferably, the transducing elements 306, 308 are positioned in a plane which is substantially normal to the thread path 120. The elements may also be staggered along the thread path within the opening 304. For clarity in the FIG., only four data elements 306 and two servo elements 308 are illustrated. However, typically the head assembly 300 would include a larger number of each. For example, if the magnetic thread 200 is formatted as illustrated in FIGS. 2A, 2B, with four data bands of eight sub-bands each and each sub-band having sixteen tracks, the head assembly 300 may include eight data transducing elements 306 for each of the sub-bands along with one servo element for each of the five servo bands. In operation, the head assembly 300 steps around the thread 200 to align the data elements 306 with a different set of tracks in each sub-band. It will be appreciated that other configurations may be employed, as is known for head assemblies for magnetic tape devices.

In order for all of the data tracks to be accessed by a fewer number of transducing elements 306, the head assembly 300 may rotate about the magnetic thread 200. FIG. 3 illustrates one method for rotating the head assembly 300 using a motorized gear 310 which engages a gear 312 secured to at least a portion of the outer surface of the head assembly 300. Preferably, the motorized gear is connected to a stepper motor capable of very precise movement to enable the head assembly 300 to be rotated to predetermined transducing positions. Other mechanisms for rotating the head assembly 300 may also be used. Moreover, the head assembly 300 may remain fixed while the transducing elements 306 and 308 rotate within the assembly 300, such as within a track, relative to the thread 200.

Figure 4A:
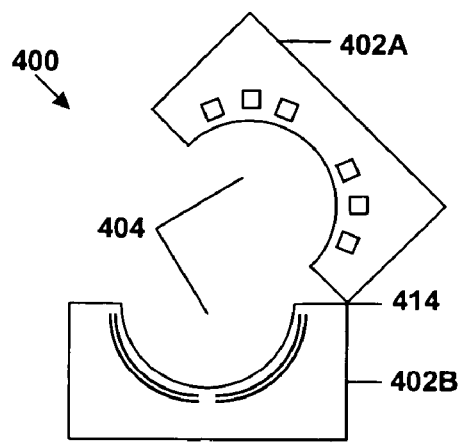
FIGS. 4A and 4B are cross-sectional views of one embodiment of a head assembly of the present invention, shown in opened and closed positions, respectively.
Figure 4B:
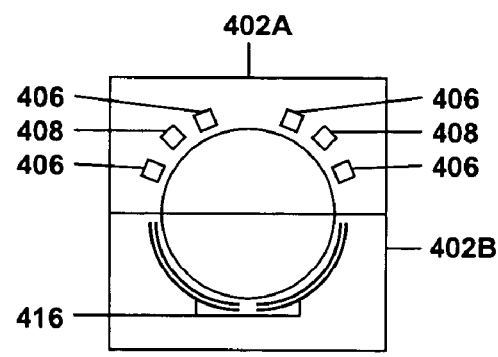

FIGS. 4A and 4B illustrate one method for positioning the magnetic thread 200 through the opening 404 in the housing 402 of a head assembly 400. The housing 402 is fabricated in two sections 402A, 402B which may be separated, such as on a hinge 414. When the two sections 402A, 402B are separated, as shown in FIG. 4A, the magnetic thread 200 may be easily passed through the gap between the two sections 402A, 402B. When the magnetic thread 200 has been properly positioned, the two sections 402A, 402B may then be closed around the thread, as illustrated in FIG. 4B.

A mechanism may be used to improve consistent contact of the magnetic thread 200 with the transducing elements 406, 408. For example, one or more springs 416 or other biased material may be positioned within the opening 404 to gently press the magnetic thread 200 against the transducing elements 406, 408.

The magnetic thread 200 may be manufactured out of any suitable material, such as polyester materials. Polyethylene terephthalate (PET) and polyethylene naphthalate (PEN) are two such materials. The magnetic thread 200 may be formed by extruding the material and coating it with a magnetic ink or film using known technologies. Extruding the polyester or other thread material provides better aligned polymer chains, leading to a stronger and more stable magnetic thread 200.

The diameter of the magnetic thread 200 will be selected based on such factors as the amount of data to be stored on the thread 200, the desired linear and track densities (which in turn are at least partially dependent upon the size of the transducing elements which can be manufactured), and the total volume allowed for the thread 200 in a cartridge or in the storage device 100. For example, if micron-size transducing elements are to be used and if it is desired to position sixteen such elements around the inside of the opening in the head assembly, the circumference of the opening would be about thirty-two microns (32μ). The resulting thread diameter would be approximately ten microns (10μ) and its length (if current data densities are maintained) would be approximately 246 km. A much larger thread diameter of, for example, six millimeters (6 mm) may have a length of approximately 400 meters at the same density.

Figure 5:
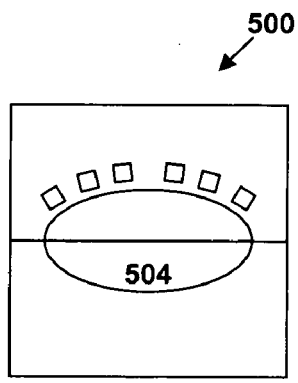
FIG. 5 is a cross-sectional view of an embodiment of a head assembly of the present invention having a non-circular opening.
Figure 6:
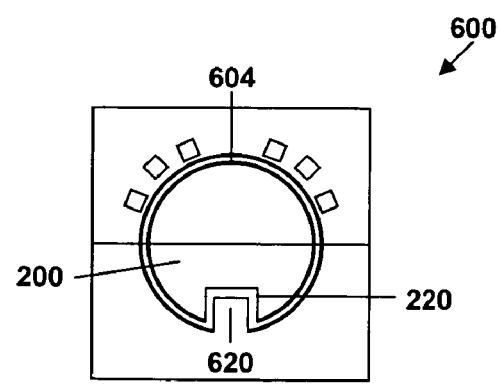
FIG. 6 is a cross-sectional view of an embodiment of a head assembly of the present invention having a key to reduce thread twisting

Because the magnetic thread 200 is preferably manufactured by extrusion, it may easily be formed with a variety of cross-sections. In order to reduce twisting as the thread 200 passes through the opening in the head assembly, therefore, the magnetic thread 200 may be formed with a non-circular cross-section and the head assembly fabricated with an opening of a corresponding non-circular cross-section. FIG. 5 is a cross-sectional view of such a head assembly 500 with an elliptical opening 504. Other cross-sections may also be used. For example, as illustrated in the head assembly 600 of FIG. 6, the opening 604 may be fabricated with a protruding "key" 620. In operation, the key 620 would mate with a corresponding slot-like or channel feature 220 formed in the thread 200, thus ensuring that the thread 200 remains in a proper position within the opening 604 without twisting.

Figure 7A:
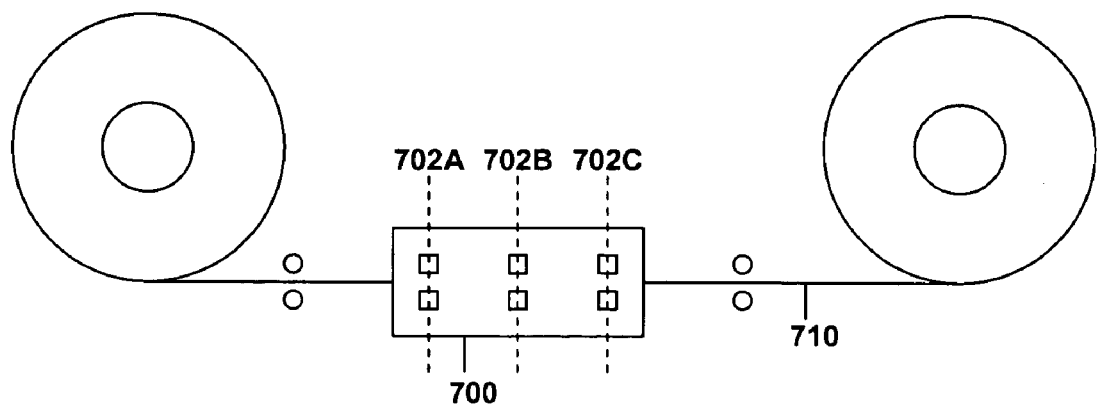
FIG. 7A illustrates a top view of multiple sets of transducing elements in the thread path.
Figure 7B:
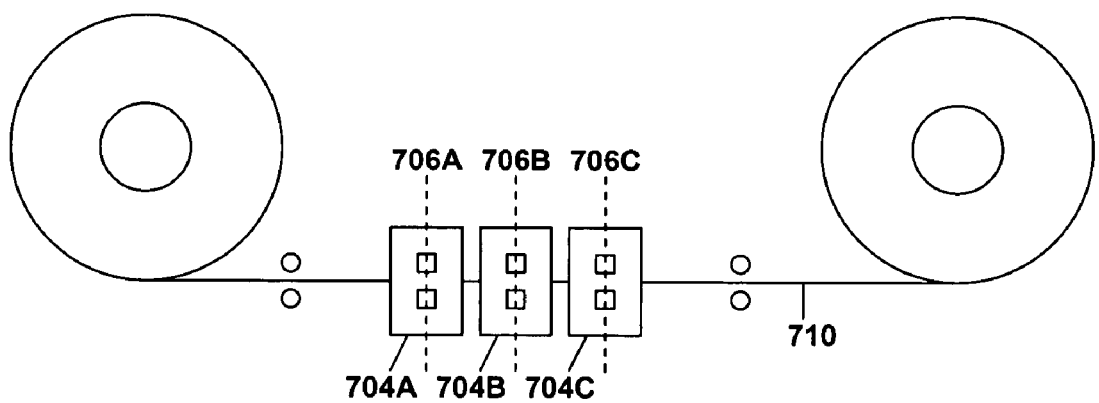
FIG. 7B illustrates a top view of multiple head assemblies in the thread path.

As illustrated in FIGS. 7A and 7B, several sets of transducing elements may be positioned in the thread path 710 to improve performance of the storage drive 100. The transducing elements may be positioned within a single head assembly 700 (FIG. 7A), preferably in different planes 702A, 702B, 702C approximately normal to the thread path 710, or may be positioned within different head assemblies 704A, 704B, 704C (FIG. 7B), also preferably in different planes 706A, 706B, 706C approximately normal to the thread path 710. If separate head assemblies 702, 704, 708 are employed, they may be rotated independently of each other; if a single head assembly 700 is employed, the transducing elements will be rotated together. One set of transducing elements may be used to write data to the thread 200 while another may be used to read data from the thread 200, thus permitting a read-after-write function. Alternatively, the transducing elements may be positioned (either fixed or through rotation) to read/write from/to different tracks simultaneously, thus increasing data throughput.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. An apparatus for writing/reading data to/from a magnetic media, comprising:
    a loader for receiving a supply reel on which a magnetic thread is wound;
    a first head assembly positioned in a thread path between a loaded supply reel and a take-up reel, the first head assembly having an inner surface defining an opening formed longitudinally therethrough coinciding with the thread path and having a cross-section of substantially the same size and shape as a cross-section of the thread, the thread being receivable in the opening;
    a transport mechanism for causing relative movement between the thread and the opening in the first head assembly;
    a first plurality of transducing elements positioned around the inner surface of the first head assembly to interact with a plurality of parallel recording tracks longitudinally-extending around the surface of the magnetic thread; and
    a data channel coupled to the transducing elements and operable to transmit data signals to be written to the thread from a host device to the transducing elements and/or transmit to the host device data signals read from the thread by the transducing elements.

2. The apparatus of claim 1, wherein the first plurality of transducing elements are positioned around the inner surface of the opening in the first head assembly in a plane substantially normal to the thread path.

3. The apparatus of claim 1, wherein:
    the first plurality of transducing elements are positioned around the inner surface in a one-to-one relationship with the plurality of recording tracks.

4. The apparatus of claim 1, wherein:
    the plurality of recording tracks is greater than the first plurality of transducing elements; and
    the apparatus further comprises means for rotating the first plurality of transducing elements about the magnetic thread to a plurality of predetermined transducing positions whereby, in each of the transducing positions, the first plurality of transducing elements are positioned in one-to-one relationships with a like number of the parallel recording tracks.

5. The apparatus of claim 1, wherein:
    the first head assembly comprises first and second sections, each section having approximately one-half of the opening formed therethrough; and
    the apparatus further comprises means for separating the first and second sections during a loading process to receive the magnetic thread into the opening.

6. The apparatus of claim 1, the first head assembly further comprising guide means biased to press the magnetic thread against the transducing elements.

7. The apparatus of claim 6, the guide means comprising a spring assembly mounted to the inner surface of the opening and located opposite the first plurality of transducing elements.

8. The apparatus of claim 1, further comprising:
    a second head assembly positioned in the thread path, the second head assembly having an inner surface defining an opening formed longitudinally therethrough coinciding with the thread path and having a cross-section of substantially the same size and shape as a cross-section of the thread, the thread being receivable in the opening; and
    a second plurality of transducing elements positioned around the inner surface of the second head assembly to interact with the plurality of parallel recording tracks.

9. The apparatus of claim 8, further comprising means for rotating the first and second pluralities of transducing elements about the magnetic thread to a plurality of predetermined transducing positions whereby, in each of the transducing positions, the first and second plurality of transducing elements are positioned in one-to-one relationships with a like number of the parallel recording tracks.

10. The apparatus of claim 9, the means for rotating the first and second pluralities of transducing elements comprising means for rotating the first plurality of transducing elements independent of the second plurality of transducing elements.

11. The apparatus of claim 9, the means for rotating the first and second pluralities of transducing elements comprising means for rotating the first plurality of transducing elements with the second plurality of transducing elements.

12. The apparatus of claim 1, wherein the cross-section of the opening in the first head assembly and the cross-section of the magnetic thread are non-circular, whereby twisting of the magnetic thread is resisted as the magnetic thread is transported through the opening.

13. The apparatus of claim 1, wherein the inner surface of the first head assembly has a key formed thereon matable with a corresponding feature formed in the magnetic thread.

14. A head assembly for writing/reading data to/from a magnetic thread transported in a thread path between first and second reels, the head assembly comprising:
    a housing having an inner surface defining an opening formed longitudinally therethrough coinciding with the thread path and having a cross-section of substantially the same size and shape as a cross-section of the thread, the thread being receivable in the opening; and
    a first plurality of transducing elements positioned around the inner surface of the first head assembly to interact with a plurality of parallel recording tracks longitudinally-extending around the surface of the magnetic thread and being electrically coupled to a data channel, whereby data to be recorded on the magnetic thread is transmitted from the channel to at least one of the transducing elements and data read from the magnetic thread is transmitted by at least one transducing element to the channel.

15. The head assembly of claim 14, wherein the plurality of transducing elements are positioned around the inner surface in a plane substantially normal to the thread path.

16. The head assembly of claim 14, wherein:
    the first plurality of transducing elements are positioned around the inner surface of the opening in a one-to-one relationship with the recording tracks.

17. The head assembly of claim 14, wherein:
the plurality of recording tracks is greater than the first plurality of transducing elements; and
the head assembly further comprises means for rotating the first plurality of transducing elements about the magnetic thread to a plurality of predetermined transducing positions whereby, in each of the transducing positions, the first plurality of transducing elements are positioned in one-to-one relationships with a like number of the parallel recording tracks.

18. The head assembly of claim 14, further comprising:
first and second sections, each section having approximately one-half of the opening formed therethrough; and
means for separating the first and second sections during a loading process to receive the magnetic thread into the opening.

19. The head assembly of claim 14, further comprising guide means biased to press the magnetic thread against the plurality of transducing elements.

20. The head assembly of claim 19, the guide means comprising a spring assembly mounted to the inner surface of the opening and located opposite the plurality of transducing elements.

21. The head assembly of claim 14, further comprising a second plurality of transducing elements positioned around the inner surface of the opening.

22. The head assembly of claim 21, further comprising means for rotating the first and second pluralities of transducing elements about the magnetic thread to a plurality of predetermined transducing positions whereby, in each of the transducing positions, the first and second pluralities of transducing elements are positioned in one-to-one relationships with a like number of the parallel recording tracks.

23. The head assembly of claim 14, wherein the cross-section of the opening in the housing and the cross-section of the magnetic thread are non-circular, whereby twisting of the magnetic thread is resisted as the magnetic thread is transported through the opening.

24. The head assembly of claim 14, wherein the inner surface of the first head assembly has a key formed thereon matable with a corresponding feature formed in the magnetic thread.

25. A method of recording and reading data from a magnetic media, comprising:
loading onto a storage drive a magnetic thread, the magnetic thread being formatted with a plurality of parallel recording tracks longitudinally-extending around the surface of the magnetic thread;
causing the magnetic thread to be transported in a thread path through an opening in a head assembly, the opening having a cross-section of substantially the same size and shape as a cross-section of the thread, the head assembly having a plurality of transducing elements positioned around an inner surface of the opening; and
transmitting signals from a data channel to the plurality of transducing elements to record data to the magnetic thread and/or transmitting data signals to the data channel read from the magnetic thread by the plurality of transducing elements.

26. The method of claim 25, wherein the plurality of transducing elements are positioned around the inner surface of the opening in a plane substantially normal to the thread path.

27. The method of claim 25, wherein the cross-section of the opening in the head assembly and the cross-section of the magnetic thread are non-circular, whereby twisting of the magnetic thread is resisted as the magnetic thread is transported through the opening.

28. The method of claim 25, wherein the inner surface of the head assembly has a key formed thereon matable with a corresponding feature formed in the magnetic thread.

* * * * *